US006813443B1

United States Patent
Lin

(12) United States Patent
(10) Patent No.: US 6,813,443 B1
(45) Date of Patent: Nov. 2, 2004

(54) SQUARE WAVE MODULATED CHARGING-CONTROL CIRCUIT FOR A FLASH UNIT OF A CAMERA

(75) Inventor: Yong-Sheng Lin, Taipei (TW)

(73) Assignee: Kye Systems Corp., Taipei (TW)

( * ) Notice: Subject to any disclaimer, the term of this patent is extended or adjusted under 35 U.S.C. 154(b) by 0 days.

(21) Appl. No.: 10/677,217

(22) Filed: Oct. 3, 2003

(51) Int. Cl.⁷ .............................................. G03B 15/05
(52) U.S. Cl. ....................................................... 396/206
(58) Field of Search ................................ 396/205, 206; 315/241 P

(56) References Cited

U.S. PATENT DOCUMENTS 6,104,144 A * 8/2000 Yoneya et al. ........... 315/241 R
6,147,460 A * 11/2000 Ichihara .................... 315/241 P

* cited by examiner

Primary Examiner—W. B. Perkey
(74) Attorney, Agent, or Firm—Bacon & Thomas, PLLC

(57) ABSTRACT

A flash unit charging-control circuit for a camera includes a voltage converter connected to a flash unit capacitor, a square-wave oscillator for causing current supplied by the voltage converter from a power supply battery to the flash unit capacitor that relieves a substantial burden on the MCU of the camera, and a current control circuit. When the battery voltage becomes low, the current control circuit will regulate the charging current so as to slow the decrease in battery voltage during charging.

8 Claims, 3 Drawing Sheets

SQUARE WAVE MODULATED CHARGING-CONTROL CIRCUIT FOR A FLASH UNIT OF A CAMERA

BACKGROUND OF THE INVENTION

1. Field of the Invention

The present invention relates to circuitry for a flash unit, and in particular, to an easy-to-control charging circuit for the capacitor of a camera flash unit. The charging circuit includes a modulator for modulating the charging current supplied to the capacitor according to the voltage state of a power supply of the camera, in order to reduce a load on the micro control unit (MCU) and also to avoid fast decreases in battery voltage during charging, thereby prolonging the useful life of the flash unit power supply and of the flash unit itself.

2. Description of the Prior Art

Devices such as a traditional camera, digital camera or cellular phone with camera are regularly equipped with a flash unit in order to cope with the underexposure problem. The flash unit is usually powered by a battery of the camera, or an alternating current (AC), with the relatively large voltage necessary to achieve a "flash" being supplied by a flash unit capacitor.

FIG. 1 shows a known flash unit charging circuit 2, including a flash unit capacitor 21, induction coil 22, capacitor 23, transformer 24, diode 25, resistances 26a~26d, transistors 27a, and field effect transistors 27b, and in which one end of the charging circuit 2 is connected to a battery 1 and another end is connected to a control pin 4 arranged to receive a control signal sent by a micro control unit/MCU (not shown). When the control pin 4 receives the control signal, the charging circuit 2 will allow the charging current Ic (average current) to charge the flash unit capacitor 21. However, because the control signal must be sustained during the charging period, the MCU suffers a relatively great load.

In order to shorten the time necessary to charge the flash unit capacitor 21, the charging current Ic is always kept at a relatively high level that leads to a rapid decrease in the voltage of the battery 1. Therefore, the MCU will detect a state of "battery low" so as to shut off the function of the flash unit. Even though the battery is still useable, the detection of a "battery low" condition will force a user to replace the battery promptly.

SUMMARY OF THE INVENTION

It is an object of the present invention to provide a flash unit charging circuit that eliminates the burden on the MCU of the flash unit.

It is another object of the present invention to provide a control circuit that modulates the charging current so as to extend the life span of the battery.

In order to accomplish these objects, the present invention provides a control circuit including a flash unit capacitor, a voltage converter, and a square-wave oscillator that eliminates the need for continuous control of the charging cycle by the MCU. Furthermore, the voltage converter includes a current control circuit arranged such that, when the voltage of the battery is relatively low, the control circuit will regulate the charging current to reduce the rate of decrease in the voltage of the battery. Therefore, the lifespan of the battery 1 is efficiently extended, albeit at the cost of lengthening the time necessary to charge the flash unit capacitor.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
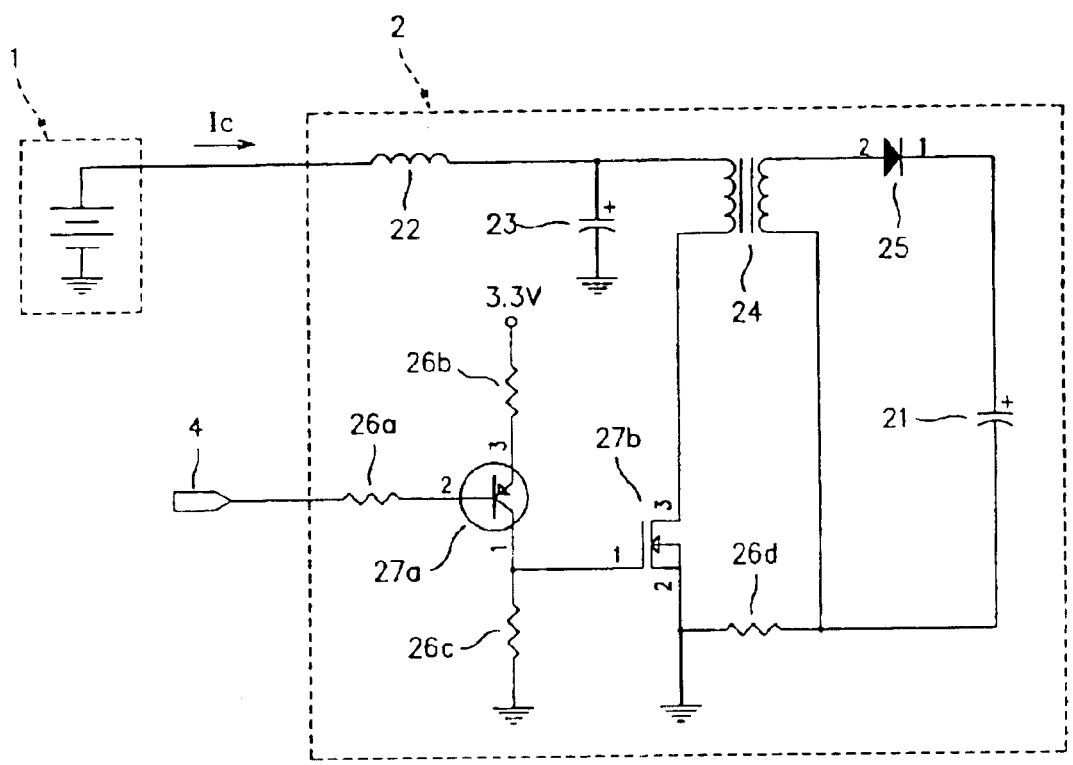
FIG. 1 is a current diagram according to a prior art.
Figure 2:
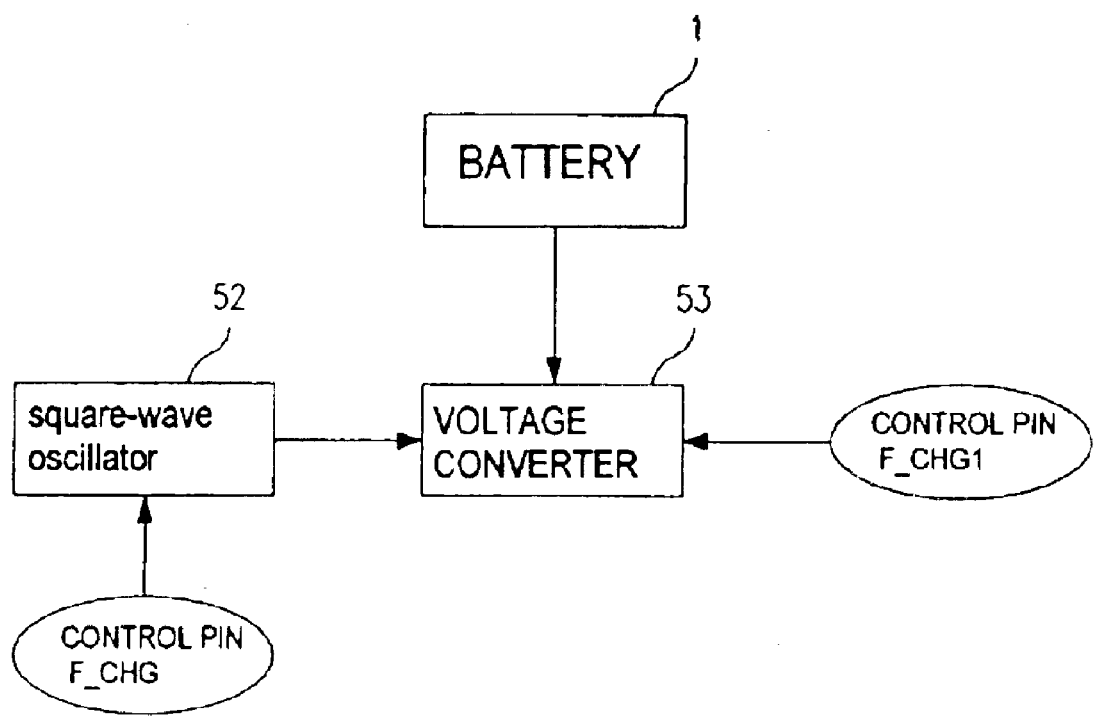
FIG. 2 is a block diagram of the present invention.
Figure 3:
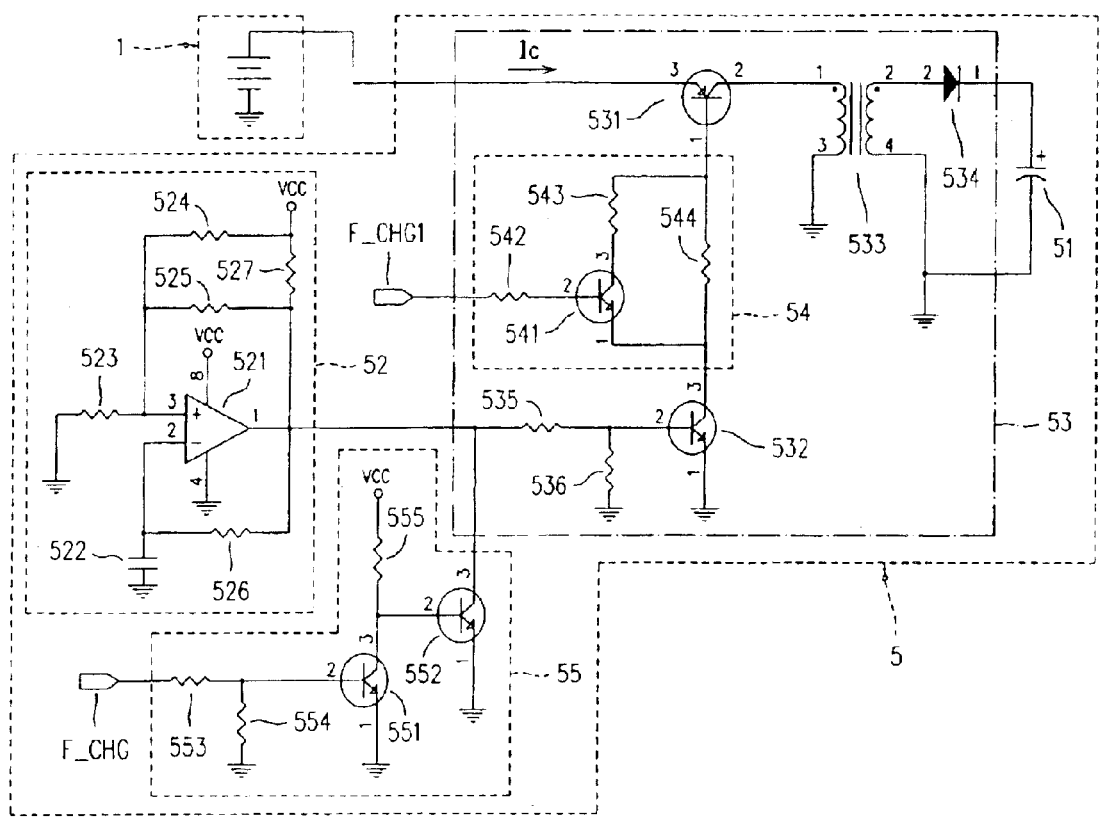
FIG. 3 is a current diagram of the present invention.

Referring to FIGS. 2 and 3, the flash unit charging-control circuit 5 includes a flash unit capacitor 51, a square-wave oscillator 52, and a voltage converter 53. The charging-control circuit 5 is connected to a power supply, such as a battery 1. The square-wave oscillator 52 has a comparator 521, capacitor 522, and resistances 523~527. Both the comparator 521 and the resistances 527 are connected to the Vcc respectively, and the square-wave oscillator 52 is connected to the control pin F_CHG as to receive a flash unit-enabling signal via a charge-enabling circuit 55. The charge-enabling circuit 55 further includes transistors 551 and 552, and resistances 553~555. As is apparent from FIG. 3, transistor 552 controls supply of the square wave output by square-wave oscillator 52 to voltage conversion circuit 53. Resistance 555 is directly connected to the Vcc.

When the camera detects the usage of the flash unit, the MCU will send a flash unit-enabling H (high) state signal to the control pin F_CHG, causing the charge-enabling circuit 55 to activate the square-wave oscillator 52 and generate a square wave signal. The square wave signal in turn causes the transistor 531 to keep turning "ON" and "OFF," resulting in an intermittent supply of charging current to the capacitor, in which the charging current/Ic (average current) will charge the flash unit capacitor 51 according to the duty cycle of the square-wave. This relieves a substantial burden on the MCU, thereby greatly increasing its efficiency.

When the charging process is completed, the MCU will send a flash unit-enabling L (low) state signal to the control pin F_CHG, causing the charge-enabling circuit 55 to inactivate the square-wave oscillator 52 and end generation of the square wave signal. The transistor 531 will therefore remain in an "OFF" state, stopping the charging process.

The voltage converter 53 includes a current control circuit 54, transistors 531, 532, transformer 533, diode 534, and resistances 535, 536. The transistor 531 connects to the battery 1 as to receive the charging current Ic and charge the flash unit capacitor 51. The current control circuit 54 is located between the transistors 531 and 532, which consists of transistor 541, resistances 542~544. The resistance 542 connects the control pin F_CHG1 so as to receive a current control signal from the MCU.

When the battery 1 is full, the MCU will send an H (high) state signal to the control pin F_CHG1 such that the current control circuit 54 will activate the transistor 541 (ON). Therefore, the flash unit capacitor 51 can be charged quickly by a large amount of Ic (average current). However, when the voltage of battery 1 becomes lower, the MCU will send an L (low) state signal to the control pin F_CHG1 such that the current control circuit 54 will close the transistor 541 (OFF) and only allow a small amount of Ic to pass. Therefore, the MCU won't detect the fast decreasing voltage (battery low) of the battery 1 promptly. Though the timeconsuming of charging process is become longer, the life span of the battery 1 is correspondingly extended.

Those skilled in the art will appreciate that the current control circuit 54 can control the transistor 541 in an analogous manner to vary the average current Ic according to the voltage of the battery 1. In addition, the concept of the present invention can be applied to any device which needs a flash unit. Also, the circuits of the present invention can be formed as a single integrated circuit (IC) so as to save space in a limited housing.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A flash unit control circuit for a camera, comprising:

a power supply;

a flash unit capacitor;

a voltage converter connected between the power supply and the flash unit capacitor and arranged to supply charging current from the power supply to the flash unit capacitor;

a square-wave oscillator connected to the voltage converter for continuously generating a square wave, and having a control signal input that causes connection of the square-wave oscillator to the voltage converter;

wherein when a micro control unit (MCU) of the camera sends a flash unit-enabling signal to the control signal input of the square-wave oscillator:

a. the square wave oscillator is connected to and supplies a square wave signal to the voltage converter, and b. said voltage converter supplies an intermittent charging current from the power supply to the flash unit capacitor in response to said supply of said square wave signal, and thereby charges the flash unit capacitor.

2. The flash unit control circuit as claimed in claim 1, wherein the voltage converter further has a first transistor, said square-wave oscillator is connected to a control electrode of the first transistor to cause said first transistor to intermittently supply said current from said power supply to said flash unit capacitor according to "ON" and "OFF" states of the square wave signal.

3. The flash unit control circuit as claimed in claim 1, further comprising a charge-enabling control circuit that supplies the flash unit-enabling signal to the square-wave oscillator so as to control the supply of said square wave signal to the voltage converter.

4. The flash unit control circuit as claimed in claim 1, wherein the power supply is a battery.

5. The flash unit control circuit as claimed in claim 1, wherein the voltage converter further has a current control circuit being able to receive a current control signal sent by the MCU, and to regulate the amount of the charging in response to detection of a voltage condition of the battery, wherein the amount of charging current is high when a voltage on the battery is high to enable rapid charging, and wherein the amount of charging current is decreased when the voltage on the battery is low to extend a life of said battery.

6. The flash unit control circuit as claimed in claim 5, wherein the current control circuit further has a second transistor, which regulates the amount of the charging current according to the current control signal.

7. The flash unit control circuit as claimed in claim 2, wherein the voltage converter further has a current control circuit arranged to receive a current control signal sent by the MCU; and wherein the current control circuit further has a second transistor, which regulates the amount of the charging current according to the current control signal.

8. The flash unit control circuit as claim 1, wherein the voltage converter includes a transformer having a secondary winding connected to the flash unit capacitor and a primary winding connected to a transistor, said transistor being connected between the power supply and the primary winding of the transformed, and said square-wave signal being supplied to a control electrode of said transistor.

* * * * *